US012071730B2

(12) United States Patent
Pleyber et al.

(10) Patent No.: US 12,071,730 B2
(45) **Date of Patent: *Aug. 27, 2024**

(54) TISSUE PRODUCT AND METHOD AND APPARATUS FOR PRODUCING SAME

(71) Applicant: Essity Hygiene and Health Aktiebolag, Gothenburg (SE)

(72) Inventors: Emilie Pleyber, Kunheim (FR); Hubert Pfister, Kunheim (FR); Pascale Saas, Ismaning (DE); Eyyup Turk, Kunheim (FR)

(73) Assignee: Essity Hygiene and Health Aktiebolag, Gothenburg (SE)

( * ) Notice: Subject to any disclaimer, the term of this patent is extended or adjusted under 35 U.S.C. 154(b) by 277 days.

This patent is subject to a terminal disclaimer.

(21) Appl. No.: 17/413,028

(22) PCT Filed: Dec. 20, 2018

(86) PCT No.: PCT/IB2018/001556

§ 371 (c)(1),
(2) Date: Jun. 11, 2021

(87) PCT Pub. No.: WO2020/128551

PCT Pub. Date: Jun. 25, 2020

(65) Prior Publication Data

US 2022/0010498 A1 Jan. 13, 2022

(51) Int. Cl.
*D21H 27/40* (2006.01)
*B31F 1/07* (2006.01)
(Continued)

(52) U.S. Cl.
CPC ............... *D21H 27/40* (2013.01); *B31F 1/07* (2013.01); *D21F 3/08* (2013.01); *D21F 11/006* (2013.01);
(Continued)

(58) Field of Classification Search
CPC .... D21H 27/40; D21H 27/007; D21H 27/008; D21H 27/02; D21H 27/30; D21H 27/002;
(Continued)

(56) References Cited

U.S. PATENT DOCUMENTS 4,100,017 A * 7/1978 Flautt, Jr. ............... A47K 10/16 162/111
6,544,386 B1 * 4/2003 Krzysik .................... B31F 1/07 162/134
(Continued)

FOREIGN PATENT DOCUMENTS

CL 2014002866 A1 2/2015
CL 2019002607 A1 2/2020
(Continued)

OTHER PUBLICATIONS

Office Action issued on Feb. 14, 2023, in corresponding Colombian Patent Application No. NC2021/0008112. (9 pages).
(Continued)

*Primary Examiner* — Jose A Fortuna
(74) *Attorney, Agent, or Firm* — BUCHANAN INGERSOLL & ROONEY PC

(57) ABSTRACT

A tissue product with at least four plies made of tissue paper base sheet or nonwoven comprises:
a first outer ply and a second outer ply and at least two inner plies between the first outer ply and the second outer ply, wherein
only one of the inner plies is un-embossed;
the outer plies comprise a micro-embossing pattern;
at least one of the outer plies comprises a décor embossing pattern; and
at least two adjacent inner plies comprise the un-embossed inner ply and one micro-embossed inner ply; wherein the density of the micro-embossed protrusions of the micro-embossed inner ply is different to the
(Continued)

density of further embossed protrusions of the micro-embossing pattern of the outer ply which is adjacent to the micro-embossed inner ply.

16 Claims, 6 Drawing Sheets

(51) Int. Cl.

| | |
|---|---|
| ***D21F 3/08*** | (2006.01) |
| ***D21F 11/00*** | (2006.01) |
| ***D21H 27/00*** | (2006.01) |
| ***D21H 27/02*** | (2006.01) |
| ***D21H 27/30*** | (2006.01) |

(52) U.S. Cl.

CPC ......... *D21H 27/007* (2013.01); *D21H 27/008* (2013.01); *D21H 27/02* (2013.01); *D21H 27/30* (2013.01); *B31F 2201/0733* (2013.01); *B31F 2201/0761* (2013.01); *B31F 2201/0782* (2013.01); *B31F 2201/0787* (2013.01); *B31F 2201/0797* (2013.01)

(58) Field of Classification Search

CPC ................ B31F 1/07; B31F 2201/0733; B31F 2201/0761; B31F 2201/0782; B31F 2201/0787; B31F 2201/0797; D21F 3/08; D21F 11/006

See application file for complete search history.

(56) References Cited

U.S. PATENT DOCUMENTS

| | | | | |
|---|---|---|---|---|
| 9,637,862 | B2 * | 5/2017 | Saas | B31F 1/07 |
| 11,280,051 | B2 * | 3/2022 | Satake Neto | D21H 27/002 |
| 11,346,058 | B2 * | 5/2022 | Pleyber | D21H 27/002 |
| 2003/0127202 | A1 * | 7/2003 | Reinheimer | B32B 5/30 162/124 |
| 2005/0034828 | A1 | 2/2005 | Graff et al. | |
| 2006/0222819 | A1 | 10/2006 | Gambini | |
| 2009/0162597 | A1 | 6/2009 | Barredo et al. | |
| 2009/0194244 | A1 * | 8/2009 | Harper | D21H 15/02 162/111 |
| 2011/0123773 | A1 | 5/2011 | Lofink et al. | |
| 2012/0156447 | A1 | 6/2012 | Hein et al. | |
| 2015/0184342 | A1 * | 7/2015 | Saas | D21H 1/02 162/132 |
| 2015/0225903 | A1 * | 8/2015 | Jeannot | B32B 29/06 162/132 |
| 2022/0010498 | A1 * | 1/2022 | Pleyber | D21F 11/006 |
| 2022/0024171 | A1 * | 1/2022 | Pleyber | D21H 27/02 |
| 2023/0011745 | A1 * | 1/2023 | Kientz | B32B 3/28 |

FOREIGN PATENT DOCUMENTS

| | | | | |
|---|---|---|---|---|
| CL | 2021001645 A1 | | 1/2022 | |
| CN | 102105299 A | | 6/2011 | |
| CN | 102574354 A | | 7/2012 | |
| CN | 104302471 A | | 1/2015 | |
| DE | 19654249 A1 | | 6/1998 | |
| DE | 19654249 A1 | * | 6/1998 | A47G 11/001 |
| DE | 102014009320 A1 | | 12/2015 | |
| DE | 102014009320 A1 | * | 12/2015 | B31F 1/07 |
| RU | 2413612 C2 | | 3/2011 | |
| TW | 592962 B | | 6/2004 | |
| WO | 02103112 A1 | | 12/2002 | |
| WO | WO-2006071147 A1 | * | 7/2006 | B31F 1/07 |
| WO | 2010086837 A2 | | 8/2010 | |
| WO | 2014020424 A1 | | 2/2014 | |
| WO | 2015197489 A1 | | 12/2015 | |
| WO | 2018166572 A1 | | 9/2018 | |
| WO | 2020126048 A1 | | 6/2020 | |
| WO | 2020126174 A1 | | 6/2020 | |
| WO | 2020128551 A1 | | 6/2020 | |
| WO | WO-2020128551 A1 | * | 6/2020 | B31F 1/07 |
| WO | WO-2021126026 A1 | * | 6/2021 | B31F 1/07 |

OTHER PUBLICATIONS

Office Action issued on Feb. 14, 2023, in corresponding Colombian Patent Application No. NC2021/0008119. (9 pages).

Office Action (First Examination Report) issued on May 12, 2022, by the Chilean Patent Office in Chilean Patent Application No. 202101645, with partial English Translation of the Office Action. (21 pages).

Office Action issued on May 31, 2023, in corresponding Colombian Patent Application No. NC2021/0008112, and English language summary. (11 pages).

International Preliminary Report on Patentability (PCT/IPEA/409) issued in corresponding International Patent Application No. PCT/IB2018/001556 dated Mar. 18, 2021. (24 pages).

International Search Report (PCT/ISA/210) and Written Opinion (PCT/ISA/237) mailed on Sep. 6, 2019, by the European Patent Office as the International Searching Authority for International Application No. PCT/IB2018/001556. (18 pages).

Written Opinion of the International Preliminary Examining Authority (PCT/IPEA/408) issued in corresponding International Patent Application No. PCT/IB2018/001556 dated Dec. 3, 2020. (10 pages).

Office Action (Decision on Grant) issued on Mar. 4, 2022, by the Federal Service for Intellectual Property in Russian Patent Application No. 2021121176/12(044380) and an English Translation of the Office Action. (13 pages).

Office Action (Decision on Grant) issued on Mar. 28, 2022, by the Federal Service for Intellectual Property in Russian Patent Application No. 2021121220/20(044425) and an English Translation of the Office Action. (18 pages).

Notification of the First Office Action issued on Jun. 6, 2022, by the Chinese Patent Office in corresponding Chinese Patent Application No. 201880100061.1, and an English Translation of the Office Action. (15 pages).

Office Action issued on Jul. 18, 2022, by the Chilean Patent Office in corresponding Chilean Patent Application No. 2021-001610, and an English Translation of the Office Action. (23 pages).

Office Action (Preliminary Conclusion of the Substantive Examination) issued on Dec. 22, 2023, by the Ukrainian Patent Office in corresponding Ukrainian Patent Application No. 2021 04230, and an English Translation of the Office Action. (12 pages).

* cited by examiner

TISSUE PRODUCT AND METHOD AND APPARATUS FOR PRODUCING SAME

FIELD OF THE INVENTION

The invention relates to a tissue product with at least four plies, a device for manufacturing such tissue product, and a method of producing such tissue product.

BACKGROUND OF THE INVENTION AND PRIOR ART

Hygiene or wiping products primarily include all kinds of dry-creped tissue paper, wet-creped paper, TAD-paper (Through Air Drying), paper based on structured technologies such as Atmos, NTT, UCTAD) and cellulose or pulp-wadding or all kinds of non-wovens, or combinations, laminates or mixtures thereof. Typical properties of these hygiene and wiping products include the reliability to absorb tensile stress energy, their drapability, good textile-like flexibility, properties which are frequently referred to as bulk softness, a high surface softness and a high specific volume with a perceptible thickness. A liquid absorbency as high as possible and, depending on the application, a suitable wet and dry strength as well as an appealable visual appearance of the outer product's surface are desired. These properties, among others, allow these hygiene and wiping products to be used, for example, as cleaning wipes such as paper or non-woven wipes, windscreen cleaning wipes, industrial wipes, kitchen paper or the like; as sanitary products such as for example bathroom tissue, paper or non-woven handkerchiefs, household towels, towels and the like; as cosmetic wipes such as for example facials and as serviettes or napkins, just to mention some of the products that can be used. Furthermore, the hygiene and wiping products can be dry, moist, wet, printed or pretreated in any manner. In addition, the hygiene and wiping products may be folded, interleaved or individually placed, stacked or rolled, connected or not, in any suitable manner.

Due to the above description, the products can be used for personal and household use as well as commercial and industrial use. They are adapted to absorb fluids, remove dust, for wrapping or even just as supporting material, as is common for example in medical practices or in hospitals.

If tissue paper is to be made out of pulp, the process essentially comprises a forming that includes a box and a forming wire portion, and a drying portion, either through air drying or conventional drying on a yankee cylinder. The production process also usually includes the crepe process essential for tissues and, finally, typically a monitoring and winding area.

Paper can be formed by placing the fibers, in an oriented or random manner, on one or between two continuously revolving wires of a paper making machine while simultaneously removing the main quantity of water of dilution until dry-solids contents of usually between 12 and 35% are obtained.

Drying the formed primary fibrous web occurs in one or more steps by mechanical and thermal means until a final dry-solids content of usually about 93 to 97% has been reached. In case of tissue making, this stage is followed by the crepe process which crucially influences the properties of the finished tissue product in conventional processes. The conventional dry crepe process involves creping on a usually 4.0 to 6.5 m diameter drying cylinder, the so-called yankee cylinder, by means of a crepe doctor with the aforementioned final dry-solids content of the raw tissue paper. Wet creping can be used as well, if lower demands are made of the tissue quality. The creped, finally dry raw tissue paper, the so-called base tissue, is then available for further processing into the paper product for a tissue paper product.

Instead of the conventional tissue making process described above, the use of a modified technique is possible in which an improvement in specific volume is achieved by a special kind of drying which leads to an improvement in the bulk softness of the tissue paper. This process, which exists in a variety of subtypes, is termed the TAD (Through Air Drying) technique. It is characterized by the fact that the "primary" fibrous web that leaves the forming and sheet making stage is pre-dried to a dry-solids content of about 80% before final contact drying on the yankee cylinder by blowing hot air through the fibrous web. The fibrous web is supported by an air-permeable wire or belt or TAD-fabric and during its transport is guided over the surface of an air-permeable rotating cylinder drum, the so-called TAD-cylinder. Structuring the supporting wire or belt makes it possible to produce any pattern of compressed zones broken up by deformation in the moist state, also named moulding, resulting in increased mean specific volumes and consequently leading to an increase of bulk softness without decisively decreasing the strength of the fibrous web.

The processing step from the base tissue that has already been optionally wound up in several plies to the finished tissue product occurs in processing machines (converting machines) which include operations such as unwinding the base tissue, repeated smoothing of the tissue, printing embossing, to an extent combined with full area and/or local application of adhesive to produce ply adhesion of the individual plies to be combined together as well as longitudinal cut, folding, cross cut, placement and bringing together a plurality of individual tissues and their packaging as well as bringing them together to form larger surrounding packaging or bundles. Such processing steps may also include application of substances like scents, lotions, softeners or other chemical additives. The individual paper ply webs can also be pre-embossed and then combined in a roll gap according to the embossing methods known in the art. Any embossing can lead to embossed elements all having the same height or to embossing elements having different heights. Ply bonding, e.g. by mechanical or by chemical means are other well-known methods mainly used for hankies, napkins, household towels and bathroom tissues.

A well-known technique to increase the thickness of a paper product is to emboss the paper web. An embossing process is carried out in the nip between an embossing roll and an anvil roll. The embossing roll can have protrusions or depressions on its circumferential surface leading to embossed protrusions in the paper web.

Anvil rolls may be softer than the corresponding embossing roll and may consist of rubber, such as natural rubber, or plastic materials, paper or steel.

For manufacturing multi-ply tissue products, especially bathroom tissue and household tissue, three manufacturing methods for embossing and adhesively bonding of the plies have established. These are Goffra Incolla/spot embossing, DESL (Double Embossing Single Lamination)/Nested, Nes-Fip and Pin-to-Pin/Foot-to-Foot.

In the first mentioned manufacturing method, Goffra Incolla, a first web is directed through the nip between an embossing roll and an anvil roll. In this nip the web is provided with an embossing pattern. Thereafter, an application roll for adhesive applies adhesive to those parts of the first web at which there are protruding embossing elements in the embossing roll. The adhesive is transported from an adhesive bath via an adhesive transfer roll to the application roll. A second web is transported to the first web and adhesively bonded to the first web in the nip between the so-called marrying roll and the embossing roll. The adhesive bonding takes place at those portions at which the adhesive was applied.

The second manufacturing method (DESL/Nested) is very similar to the above-described Goffra Incolla method. It comprises an additional pair of rolls consisting of a second embossing roll and a second anvil roll. The additional pair of rolls serves to emboss the second web before it is adhesively bonded to the first web using the marrying roll. Typically, the additional pair of rolls is placed close to the first pair of rolls and the marrying roll. Especially when using the so-called Nested-method such close arrangement is important. The Nested-method can be considered as a special case of the general DESL-manufacturing method. For the Nested-method the embossing elements of the first embossing roll and the embossing elements of the second embossing roll are arranged such that the embossed elements of the first embossed ply and the embossed elements of the second embossed ply fit into each other similar to a gearing system. This serves to achieve a mutual stabilization of the two plies. However, for the DESL manufacturing method such correlation between the embossed elements of the first, upper ply and the second, lower ply, does not have to apply. Nevertheless, in the literature the term DESL is often used synonymous to a Nested-method.

The third manufacturing method (Pin-to-Pin/Foot-to-Foot) is similar to the DESL method. By means of two pairs of rolls both the upper ply and the lower ply are embossed, respectively. Adhesive is applied onto the embossed protrusions of the first ply. The ply bonding however, is not achieved by means of a marrying roll as in the DESL method but is achieved directly by means of the protruding embossing elements of the second embossing roll. In order to achieve this, an exact adjustment of the width of the nip between the first embossing roll and the second embossing roll is required, which is mainly defined by the individual thickness of both webs (upper ply and lower ply). Further, the embossing rolls have to be designed such that the protruding embossing elements of both rolls face each other. This is the reason why the terminology Pin-to-Pin or Foot-to-Foot embossing is used.

All above described methods have the following common features: the first embossing roll is formed of a hard material, usually metal, especially steel, but there are also known embossing rolls made of hard rubber or hard plastics materials. The embossing rolls can be a male roll having individual protrusions. Alternatively, the embossing roll can be a female roll with individual embossing depressions. Typical depths of the engraved embossing patterns are between 0.4 and 2.0 mm.

The anvil roll typically has a rubber coating with a hardness between 35 Shore A and 85 Shore A. However, structurized anvil rolls, especially rolls made of paper, rubber or plastics materials or steel are also known.

The applicator roll for adhesive is usually also a rubber roll with a plain smooth circumferential surface, wherein the hardness of the rubber coating is between the hardness of the anvil roll and the hardness of the marrying roll. Commonly used values for the hardness of the rubber coating are 70 to 85 Shore A. When selecting the rubber material its compatibility with the adhesive to be applied has to be ensured.

The application system for adhesive consisting of applicator roll, adhesive transfer roll and adhesive bath can be designed as a so-called immersion roll system in which the adhesive transfer roll is immersed into the adhesive bath and transports adhesive by means of surface tension and adhesive forces out of the adhesive bath. By adjusting the gap between the adhesive transfer roll and the applicator or application roll, the amount of adhesive to be applied can be adjusted. Application rolls may be structured rolls. Recently, adhesive transfer rolls have become known having defined pit-shaped depressions in their circumferential surface. Such adhesive transfer rolls are known as Anilox-rolls. Such roll is usually made of ceramic material or it is a roll made of steel or copper and coated with chromium. Excessive adhesive is removed from the surface of the Anilox-roll by means of a blade. The amount of adhesive is determined by the volume and the number of depressions. Alternative application systems for applying adhesives are based on spraying equipment (Weko-technique).

A second possibility to influence the amount of adhesive transferred is the adjustment of the difference in circumferential speeds of the adhesive transfer roll and the applicator roll. Typically, the adhesive transfer roll rotates slower than the applicator roll. The circumferential speed of the adhesive transfer roll is usually between 5% and 100% of the first circumferential speed of the applicator roll. The adhesive bath can be designed as a simple trough, application systems with a blade can also be designed as chamber systems.

The embossing technologies Goffra Incolla/spot embossing and DESL/Nested, both use an additional roll, the so-called marrying roll for laminating together the plies. The marrying roll commonly has a smooth rubber surface with a hardness of about 80-100 Shore A, especially 90-95 Shore A. A suitable material is e.g. NBR (acrylnitrile-butadien rubber). However, marrying rolls also have become known which, in addition to the rubber coating, are provided with a steel coating. Such steel coating is often provided in form of a steel band spirally wound onto the rubber coating.

In case that the single layers individually or together are pre-embossed, a so-called micro-pre-embossing device is used. Such pre-embossing device is often used in combination with the Goffra Incolla technology. Also commonly used is a printing onto the tissue product before or after the ply bonding step. Also known are variants including the application of chemical substances, especially lotions and softeners.

Another well-known embossing technique comprises a steel embossing roll and a corresponding anvil steel roll (so-called Union embossing). The surfaces of these rolls are being formed in such a manner that deformation of the paper and mechanical ply bonding without using adhesives are achieved within one single embossing step.

When using all of the above described three embossing methods it is advantageous to provide a control for the tension of the web both before and after the ply bonding because the physical properties of the web and especially the stress-strain characteristic can be changed significantly in the embossing step.

The embossing technology also comprises so-called "double height embossing" whereby the embossing protrusions have different heights.

The embossing not only serves to provide bulk to the fibrous product but also to provide an improved optical appearance to the product. The optical appearance can be improved by combining embossing and coloring steps. Another reason for embossing is to generate higher absorbency or improved perceived softness.

U.S. Pat. No. 9,637,862 B1 describes a hybrid multi-ply tissue paper product with at least one TAD-ply which is positioned and oriented with respect to the at least two other conventional wet pressed plies such that the structured back face of the structured ply is facing the at least two other plies so as to dampen a two-sidedness effect related to the structured back face.

WO 2018/166572 A1 discloses a multi-ply tissue paper product in which two inner plies are flat plies. One of the outer plies includes a décor embossing pattern comprising a soft region surrounded by a décor embossing region.

SUMMARY OF THE INVENTION

It is the object of the invention to provide a tissue product with an improved caliper, strength and softness, a method for producing such product and an apparatus for carrying out such method.

This object is solved by a tissue product with the features of claim 1, an apparatus for carrying out such method according to claim 18 and a method for producing such product with the features of claim 24. Preferred embodiments follow from the other claims.

The inventive tissue product with at least four plies made of tissue paper base sheet or non-woven comprises a first outer ply and a second outer ply and at least two inner plies between the first outer ply and the second outer ply. At least one of the outer plies comprises a décor embossing pattern and at least two adjacent inner plies comprise the un-embossed inner ply and one micro-embossed inner ply.

According to the invention, any combination of dry creped plies, wet creped plies and structured plies can be used. Only one of the inner plies is un-embossed which means that this ply is not embossed by means of a contact with an embossing roll before it is fed to the final ply-bonding. Multi-ply products can also be hybrid products when it is desired to manufacture a product with a degree of two-sidedness. Especially, the tissue paper can be produced from paper-making fibers according to "Conventional Processes" as in the manufacture of "Dry Creped Tissue" or "Wet Crepe Tissue" or "Process for Structured Tissue" such as the Through Air Drying (TAD) manufacturing method, the manufacture of uncreped through-air dried (UCTAD) tissue, or alternative manufacturing methods, e.g. the Advanced Tissue Molding System (ATMOS) of the company Voith, or Energy Efficient Technologically Advanced Drying eTAD of the company Georgia Pacific, or Structured Tissue Technology SST of the company Metso Paper. Hybrid processes like NTT (New Textured Tissue of the company Metso Paper) which are alternations of the conventional processes can be used, too.

The fibrous tissue product according to the invention is especially a tissue paper product, non-woven product or a hybrid thereof, and preferably a hygiene and cleaning product.

The term non-woven according to ISO 9092, DIN EN 29092 is applied to a wide range of products which, in terms of their properties are located between those of paper (DIN 6730, May 1996) and cardboard (DIN 6730) on the one hand, and textiles on the other hand. As regards non-wovens a large number of extremely varied production processes are used, such as the air-laid and spun-laced techniques as well as the wet-laid techniques. The non-wovens include mats, non-woven fabrics and finished products made thereof. Non-wovens may also be called textile-like composite materials, which represent flexible porous fabrics that are not produced via the classic methods of weaving warp and weft or by looping. In fact, non-wovens are produced by intertwining, cohesive or adhesive bonding of fibers, or a combination thereof. The non-woven material can be formed of natural fibers, such as cellulose or cotton fibers, but can also consist of synthetic fibers such as polyethylene (PE), polypropylene (PP), polyurethane (PU), polyester, fibers on the basis of polyethylene-terephtalate, polyvinyl alcohol, nylon or regenerated cellulose or a mix of different fibers. The fibers may, for example, be present in the form of endless fibers or pre-fabricated fibers of a finite length, as synthetic fibers, or in the form of staple fibers. The non-wovens as mentioned herein may thus consist of mixtures of synthetic and cellulose fibrous material, e.g. natural vegetable fibers (see ISO 9092, DIN EN 29092).

The term "hygiene products" and "cleaning products" as used herein comprise bathroom tissue, household towels, handkerchiefs, facial tissues, napkins, wiping and cleaning products as well table ware.

In a multi-ply product, the advantages of the invention and especially the improved softness, caliper and strength are more pronounced when there is an increased number of plies. However, the advantage of adding one further ply becomes less pronounced with an increasing number of plies. Therefore, a product with four plies or five plies was found to be a good compromise with high softness and strength and still not too high rigidity of the product.

Preferably, the outer plies comprise a micro-embossing pattern with outer embossed protrusions, and the density of the inner micro-embossed protrusions of the micro-embossed inner ply is different to the density of the outer embossed protrusions of the micro-embossing pattern of the outer ply which is adjacent to the micro-embossed inner ply.

The different densities of the embossed protrusions of the inner ply and the adjacent outer ply avoid the nesting of the embossed protrusions which increases the bulk and the softness of the tissue product.

Preferably, at least one of the embossed plies comprises a double layer or plural layers.

According to a preferred embodiment, a considerable portion of the outwardly facing main surface of the first outer ply is provided with a soft region surrounded by a décor embossing region. This soft region is provided with first micro-embossed protrusions and the décor embossing region comprises first embossed décor protrusions. The first micro-embossed protrusions are essentially not adhesively bonded to an inner ply adjacent to the top ply.

Since the first micro-embossed protrusions are essentially not adhesively bonded to an inner ply adjacent to the top ply, the softness of the tissue product is considerably increased. This effect becomes pronounced if the soft region is surrounded by the décor embossing region. The term "surrounded" also covers an arrangement of individual spaced décor protrusions. The overall design is such that the soft region is perceived to be surrounded by the décor region. However, in order to be perceived as a soft region surrounded by a décor embossing region of first outer ply, such soft region is preferably a single coherent region or at least subdivided in at most two sub-regions.

Preferably, the plies are adhesively bonded to each other using glue which may be non-colored or colored.

For laminating together the single webs, different types of adhesive can be used. Suitable adhesives are, inter alia, glue on the basis of starch or modified starch like for example methyl cellulose or carboxylized methyl cellulose and adhesively acting polymers on the basis of synthetic resins, caoutchouc, polypropylene, polyisobutylene, polyurethane, polyacrylates, polyvinylacetat or polyvinyl alcohol. Such adhesives can also contain dyes in order to improve the optical appearance of the finished products. Frequently, water based glues are used for laminating together paper layers.

Preferably, when laminating together a top ply and an inner ply by means of an adhesive, the adhesive is supplied towards the protruding parts of the embossing roll. This technique for applying the adhesive can be used in combination with all predominantly used manufacturing techniques In an attempt to influence the mechanical behavior of the multi-ply tissue product, the glue is be applied selectively on specific protrusions of the embossing roll. In other words, the adhesive is not applied to all protrusions but only in selected sections of the embossing roll so that the overall ratio of the surface area in which adhesive has been applied relative to the overall surface area can be varied within a broad range.

The use of glue is another means to influence the technical properties of the combined product, especially the overall stiffness of the tissue product.

If colored glue is used, this is selected in order to give a specific optical appearance to the product.

In order to combine a plurality of plies and specially two plies together, the plies are preferably adhesively bonded together at the tips of the embossing patterns of the plies facing each other.

Preferably, the density of the embossed protrusions of the micro-embossing pattern of the inner ply is different to the density of the protrusions of the second micro-embossing pattern of the second outer ply, preferably smaller than the density of the protrusions of the second micro-embossing pattern of the second outer ply.

Such different densities avoid that these two plies are nesting.

It was found to be advantageous if the first micro-embossed protrusions of the first outer ply and/or the embossed protrusions of the micro-embossing pattern of the micro-embossed inner ply and/or the protrusions of a second micro-embossing pattern of the second outer ply are arranged in a density from 30 to 200 dots/cm$^2$.

A density above 100 dots/cm$^2$ and even up to 200 dots/cm$^2$ has not been feasible for a long time. Only with the option to manufacture embossing rolls using 3D-printing, it has become possible to generate embossing rolls with such a high density of embossing projections on its circumferential surface.

The claimed technology works for any densities of the embossed protrusions but it is more efficient if the density is high. It has been found that a higher density of the embossed protrusions contributes to the perceived softness of the product. Further, the absorbency performance also increases with the density of the embossed protrusions.

Preferably, a middle ply adjacent to first outer ply is provided with a décor embossing region with further embossed décor protrusions which are in register with the first embossed décor protrusions.

According to a preferred embodiment, the un-embossed inner ply is adjacent to the first outer ply or second outer ply.

Preferably, at least three inner plies are provided and a first inner ply not adjacent to the first outer ply or second outer ply is provided with a micro-embossing pattern, and a second inner ply between the first inner ply and either the first outer ply or second outer ply is un-embossed.

The third ply needs not to be fully covered by the micro-embossing pattern in order to achieve the advantageous effect of an increased bulk.

According to a preferred embodiment, the micro-embossing pattern of the first inner ply extends essentially all over the surface of the first inner ply.

Advantageously, less than 0.5% of the outer micro-embossed protrusions are adhesively bonded to an inner ply adjacent to the first outer ply. Such a small proportion of the outer micro-embossed protrusions which are bonded to an adjacent inner ply further increase the perceived softness of the product because the soft region of the first outer ply can be slightly moved relative the adjacent inner ply. Such a relative movement in the main plane of the product largely contributes to soft feeling when handling the product.

According to a preferred embodiment the soft region surrounded by the décor embossing region covers between 25% and 90%, preferably between 30% and 80%, and more preferably between 35% and 50%, and most preferably around 45% of the outwardly facing main surface of the first outer ply.

The larger the soft region is in relation to the surface area of one sheet of the product, the higher is the perceived softness for the user. On the other hand, if the soft region is selected to be too high, the required ply bonding and integrity of the product can no longer be ensured. Therefore, the claimed range between 25% and 50% was found to provide a good compromise between perceived softness and mechanical stability of the multi-ply product.

Preferably, the tissue product either comprises a stack of individual sheets or a roll with transversely extending weakening lines to subdivide the web into individual sheets.

According to a preferred embodiment, the embossing is in register with the dimensions of the individual sheets of the tissue product.

This has the advantage that each sheet has exactly the same embossing pattern. The soft region can be arranged centered on each individual sheet, and the individual embossing patterns can be arranged such that an undesired nesting of adjacent plies can be prevented.

According to a preferred embodiment, the application of glue is restricted to an overall surface fraction of less than 12%, preferably less than 2.5% of the tissue product.

Preferably, the soft region has an overall oval shape. Such a shape follows the rectangular shape of individual sheets so that a relatively large surface area of each sheet can be covered by the soft region. However, the soft region can be circular or rectangular or can show any other symmetrical shape.

According to a preferred embodiment, the décor embossing region of the first outer ply further comprises second embossed décor protrusions with a smaller height than the height of the first embossed décor protrusions.

The provision of second embossed décor protrusions with a smaller height than the height of the first embossed décor protrusions makes it possible to further reduce the amount of glue which can only be applied to the first embossed décor protrusions with a higher height. A small amount of glue results in a higher softness of the product. Further, the aesthetic appearance can be improved by providing different types of décor protrusions.

The inventive device for manufacturing a tissue product according to any of the preceding claims comprises a first engraved roll running against a first anvil roll, wherein the first engraved roll is designed to emboss the first outer ply, a glue application device adjacent to the first engraved roll, and a marrying roll cooperating with the first engraved roll. A second engraved roll runs against a second anvil roll, wherein the second engraved roll is arranged and designed to emboss the second outer ply. A third engraved roll runs against a third anvil roll, wherein the third engraved roll is arranged to emboss one of the inner plies. The device further comprises means to direct at least one un-embossed inner ply towards the first engraved roll downstream of the nip between the first engraved roll and the marrying roll.

The inventive device needs only a relatively small number of machine components, because the individual plies are all directed towards the first engraved roll and the final ply bonding takes place between the first engraved roll and the marrying roll.

The anvil roll is preferably made of rubber like EPDM or NBR (nitrylbutadien rubber), paper or steel.

Preferably, the anvil roll has a hardness between 20 Shore A and 85 Shore A, preferably between 35 Shore A and 70 Shore A and most preferably a hardness between 45 Shore A and 60 Shore A.

According to a preferred embodiment, the first engraved roll has a repeating pattern of embossing protrusions with décor embossing regions surrounding regions provided with micro-embossing protrusions.

The provision of both the décor embossing pattern and the micro-embossing pattern on the first engraved roll further reduces the number of required machine components, because no additional pre-embossing station is required to provide the micro-embossing pattern on the first outer ply before providing that the core embossing pattern in an additional embossing step.

It has been found that a higher height of the embossed protrusions improves the aesthetic appearance of the product.

Preferably, the device further comprises an additional embossing roll and a cooperating anvil roll for embossing one of the inner plies.

Preferably, the device further comprises a perforating device to generate transversely extending weakening lines to subdivide the web into individual sheets.

According to a first preferred, alternative embodiment, the device further comprises a stacking device to form stacks of individual sheets of the tissue product.

According to a preferred embodiment, the apparatus further comprises a folding unit for providing a folded tissue product.

According to a second preferred, alternative embodiment, the device further comprises a winding device to form rolls of the perforated or un-perforated tissue product.

The inventive method for manufacturing a tissue product according to the invention comprises the steps:

(a) directing a first outer ply into the nip between a first engraved roll running against a first anvil roll;
(b) directing an inner ply into the nip between a third engraved roll running against a third anvil roll to form an embossed inner ply;
(c) feeding the embossed inner ply and an un-embossed inner ply towards the first engraved roll downstream of the first anvil roll, wherein either the un-embossed inner ply or the embossed inner ply comes into contact with the embossed first outer ply;
(d) directing a second outer ply into the nip between a second engraved roll running against a second anvil roll to form an embossed bottom ply;
(e) feeding the embossed second outer ply towards the first engraved roll upstream of the marrying roll; and
(f) joining the plies in the nip between the first engraved roll and the marrying roll.

The inventive methods employs only a relatively small number of manufacturing steps, because the individual plies are all directed towards the first engraved roll and the final ply bonding takes place between the first engraved roll and the marrying roll.

Preferably, in the inventive method an un-embossed ply is brought in direct contact with the embossed first outer ply or second outer ply.

Preferably, the method further comprises the step of directing a second inner ply into the nip between a fourth roll running against a fourth anvil roll. Such process step can be used to emboss an inner ply with a micro-embossing pattern which is different to the micro-embossing pattern of an adjacent outer ply.

According to a preferred embodiment, two un-embossed inner plies and one embossed inner ply are used, wherein the embossed inner ply is sandwiched between the two un-embossed inner plies.

It is important that, when using two un-embossed inner plies, these two un-embossed inner plies will not be in contact with each other. In order to achieve the desired bulk of the product, it was found to be necessary to arrange an embossed inner ply and the two un-embossed inner plies such that the embossed inner ply is arranged between the two un-embossed inner plies.

Preferably, in step (a) either two first outer plies or two second outer plies are embossed together.

According to a preferred embodiment, in step (a) and/or step (d) the outer ply is embossed in two separate steps which is a first pre-embossing step to provide the micro-embossing pattern followed by a second décor embossing step to provide the décor embossing.

The provision of the micro-embossing pattern and the décor embossing pattern in two separate method steps makes it possible to generate complex embossed geometries even with a superposition of the different embossing patterns. Further, such method might be beneficial when an existing process already using a pre-embossing step is modified to manufacture the inventive product.

BRIEF DESCRIPTION OF THE DRAWINGS

In the drawings, some embodiments of the invention are shown.

DESCRIPTION OF PREFERRED EMBODIMENTS

Figure 1:
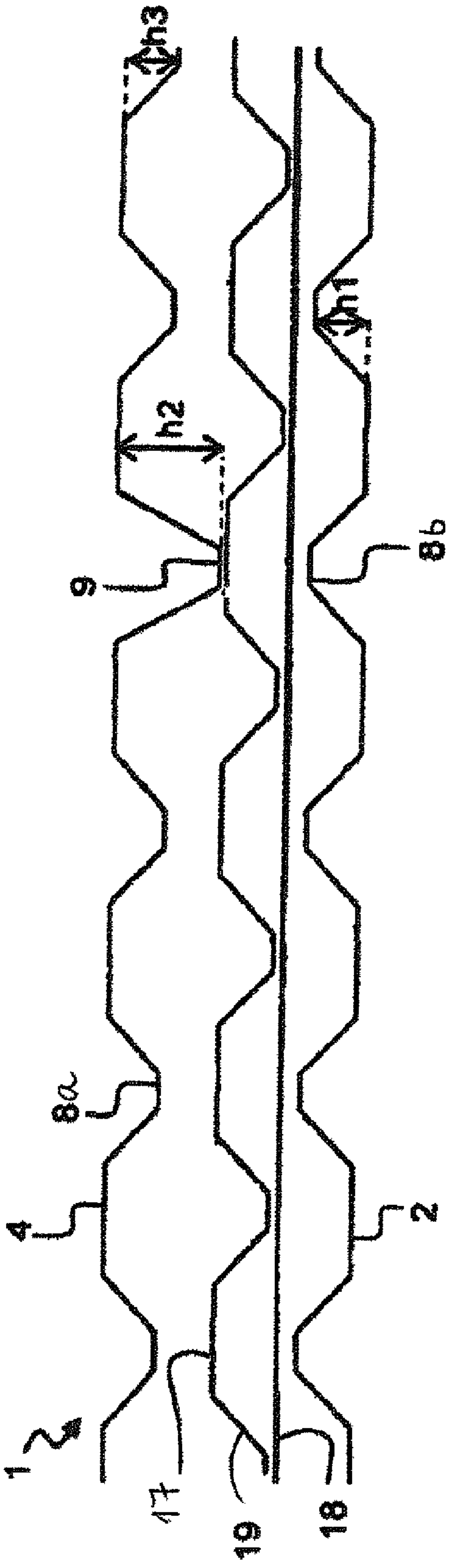
FIG. 1 schematically shows a cross-sectional view of a first product embodying the invention.

In the following description of exemplary, preferred embodiments, the same reference numerals will be used for the same or similar elements.

FIG. 1 shows an example of a multi-ply tissue product according to the invention. The tissue product 1 has a first outer ply 4 which is a top ply, and a second outer ply 2 which is a bottom ply. In the following, reference will be made to top ply and bottom ply, respectively, although there is no definition as to which of the outer plies is supposed to be the top ply.

The top ply 4 and the bottom ply 2 are both provided with an embossing pattern including micro-embossed protrusions 8. However, it is also possible to provide the top ply and/or the bottom ply as so-called structured plies, for example manufactured by means of a Through Air Drying Process.

In the example according to FIG. 1, two inner plies 17, 18 are provided. The second inner ply 18 adjacent to the bottom ply 2 is un-embossed which means that the second inner ply 18 is not embossed by means of a contact with an embossing roll before it is fed to the final ply-bonding.

The first inner ply 17 between the second inner ply 18 and the top ply 4 is micro-embossed in order to increase the bulk of the tissue product 1.

The height h3 of the embossed protrusions 8*a* of the top ply 4 can be different to the height h1 of the embossed protrusions 8*b* of the bottom ply 2. Further décor embossed protrusions 9 are provided in the top ply 4. At the décor embossed protrusions 9 with a higher height h2, the ply bonding between the top ply 4 and the second middle ply 17 is generated by means of glue which is applied towards the top surfaces of the décor embossed protrusions. Typical depths of the engraved embossing patterns are between 0.4 mm and 2.0 mm. Since the application of glue is restricted to an overall surface fraction of less than 12%, preferably less than 2.5% of the tissue product, the softness of the product can be increased.

The application of glue can also be performed on the flat ply.

Both the top ply 4 and the bottom ply 2 can consist of more than one single layer of tissue web material, for example of a double layer of tissue material.

As can be seen in FIG. 1, the embossed protrusions 19 of the first middle ply 17 and the embossed protrusions of the adjacent top ply 4 are not in register with one another. This increases the bulk and absorbency of the tissue product 1 because the protrusions 19, 8*a* cannot nest one into the other which would reduce the thickness of the tissue product.

Also the provision of different densities of the embossed protrusions 19 of the inner ply 17 and the embossed protrusions 8*a* of the adjacent outer ply 4 avoid the nesting of the embossed protrusions which increases the bulk and the absorbency of the tissue product.

Figure 2:
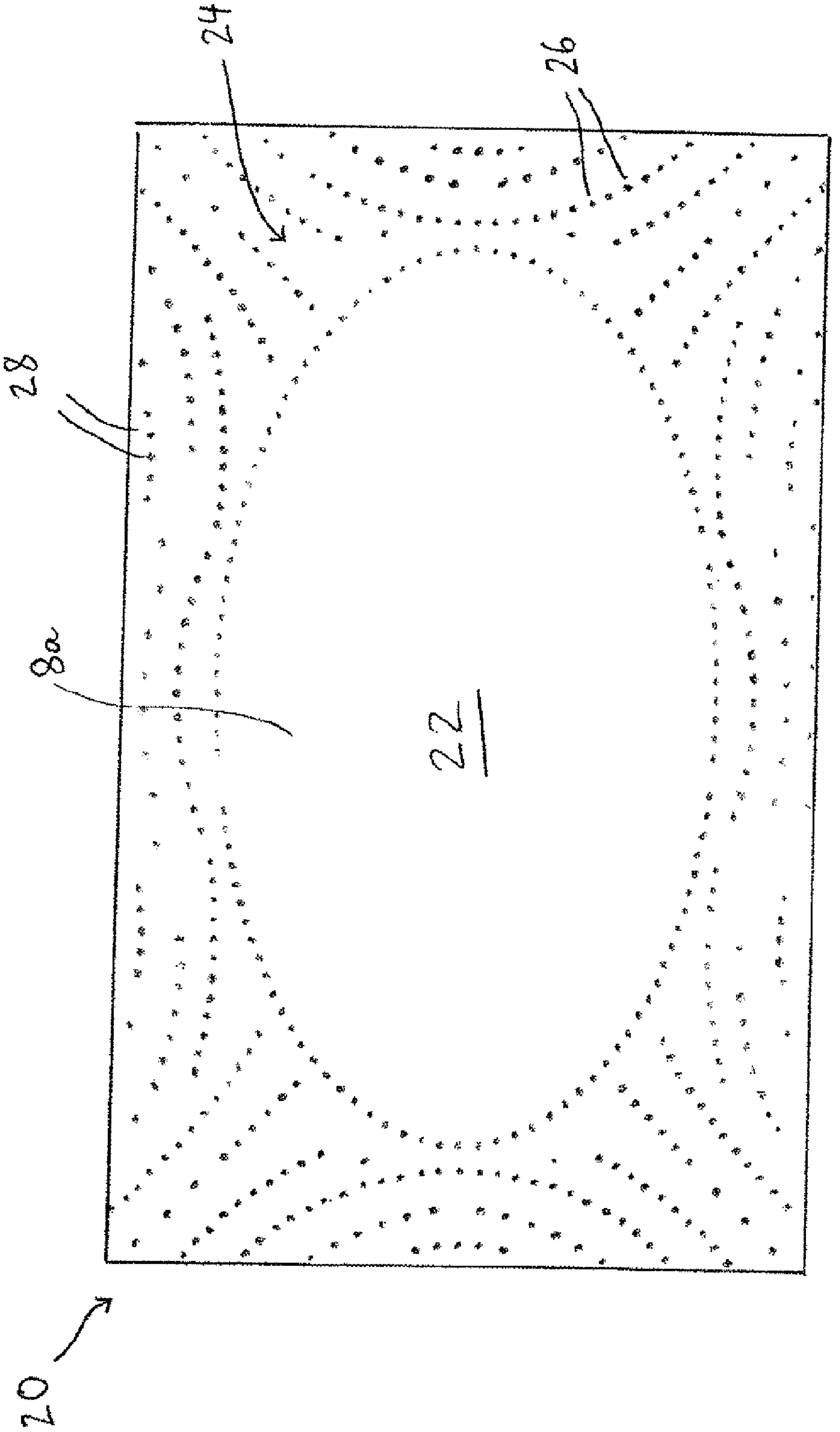
FIG. 2 schematically shows a top view of a product according to the invention.

In FIG. 2, a top view of a single sheet 20 of the tissue product 1 is shown. The sheet 20 according to FIG. 2 has a soft region 22 with an overall oval shape. Such a shape essentially harmonizes with the rectangular shape of individual sheets so that a relatively large surface area of each sheet can be covered by the soft region. However, the soft region can be circular or rectangular as well. The soft region 22 covers at least 25% and up to 90% of the surface area of the sheet 22.

Further, a décor embossing region 24 is provided which comprises embossed décor protrusions 26. The embossed décor protrusions can be provided with different shapes, and especially different heights. Besides the embossed décor protrusions 26, second embossed décor protrusions 28 can be provided with a smaller height than the height of the first embossed décor protrusions 26.

When the embossing is in register with the dimensions of the individual sheets of the tissue product, this has the advantage that each sheet has exactly the same embossing pattern. The soft region can be arranged centered on each individual sheet, and the individual embossing patterns can be arranged such that an undesired nesting of adjacent plies can be prevented.

The soft region 22 is provided with micro-embossed protrusions 23 which are essentially not adhesively bonded to an inner ply adjacent to the top ply.

A density of such micro-embossed protrusions 8*a* (see FIG. 1) above 100 dots/cm$^2$ and even up to 200 dots/cm$^2$ has not been feasible for a long time. Only with the option to manufacture embossing rolls using 3D-printing, it has become possible to generate embossing rolls with such a high density of embossing projections on its circumferential surface.

The claimed technology works for any densities of the embossed protrusions but it is more efficient if the density is high. It has been found that a higher density of the embossed protrusions contributes to the perceived softness of the product. Further, the absorbency performance also increases with the density of the embossed protrusions.

Figure 3:
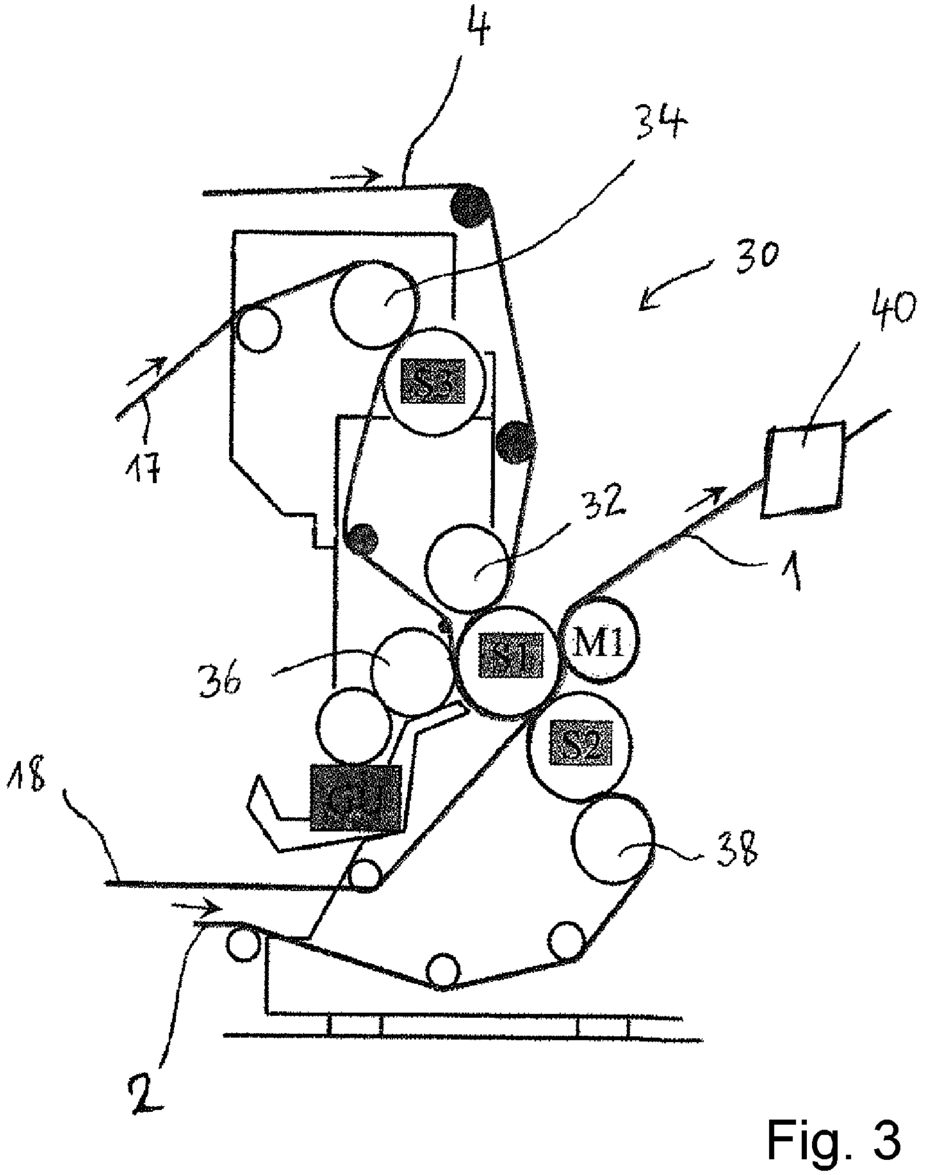
FIG. 3 schematically shows a process for manufacturing a product according to FIG. 1.

FIG. 3 schematically shows the device for manufacturing a product according to FIG. 1. The top ply 4, bottom ply 2, first inner ply 17 and the second inner ply 18 are directed into the device 30.

The central element of the device 30 is the embossing roll S1 which is an engraved steel roll. The top ply 4 which can also be provided as a double layer is directed into the nip between the embossing roll S1 and a counter roll 32 in order to emboss the top ply or top plies 4. After having been embossed, the first middle ply 17 joins the top ply. Before joining the top ply 4 at the embossing roll S1, the first middle ply 17 is micro-embossed in the nip between the engraved steel embossing roll S3 and the counter roll 34.

After the top ply top plies 4 and the first middle ply 17 have been joined at the embossing roll S1, glue is applied towards the first middle ply 17 by means of a glue application device 36. Since the embossing roll S1 has micro-embossing protrusions of a smaller height and décor embossing protrusions of a higher height, the glue is only applied towards the first middle ply 17 at the décor embossing protrusions with the higher height.

The second middle ply 18 is un-embossed and fed towards the embossing roll S1 downstream of the glue application device 36. The second middle ply 18 is directed into the gap between the embossing roll S1 and a second embossing roll S2 which also runs against the counter roll 38. The second embossing roll S2 is also an engraved steel roll with a micro-embossing pattern. In the nip between the second embossing roll S2 and the counter roll 38, the bottom ply 2 is embossed. However, the embossing roll 52 can additionally also be provided with décor embossing protrusions. The second middle ply 18 joins first middle ply 17 and the bottom ply 2 and becomes sandwiched between these two.

After leaving the gap between the embossing roll S1 and the second embossing roll S2, the multi-ply structure is directed into the nip between the embossing roll S1 and a driven marrying roll M1 where the final ply bonding takes place. Downstream of the marrying roll M1, the multi-ply tissue product 1 according to the invention can be directed to a perforating unit 40 at which the tissue product 1 receives perforation lines which are provided at regular intervals in a direction perpendicular to the longitudinal direction of the multi-ply tissue product 1.

Downstream of the perforating unit 40, the tissue product 1 can either be wound to a roll or folded to become a stack of individual sheets.

Figure 4:
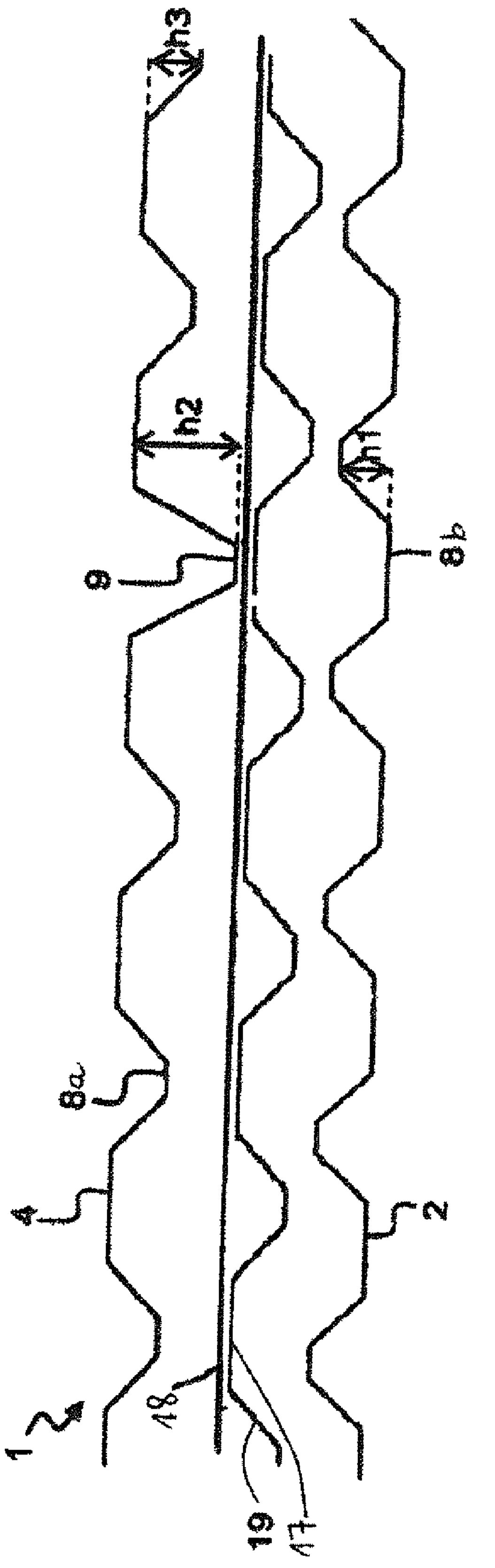
FIG. 4 schematically shows a cross-sectional view of a third product embodying the invention.
Figure 5:
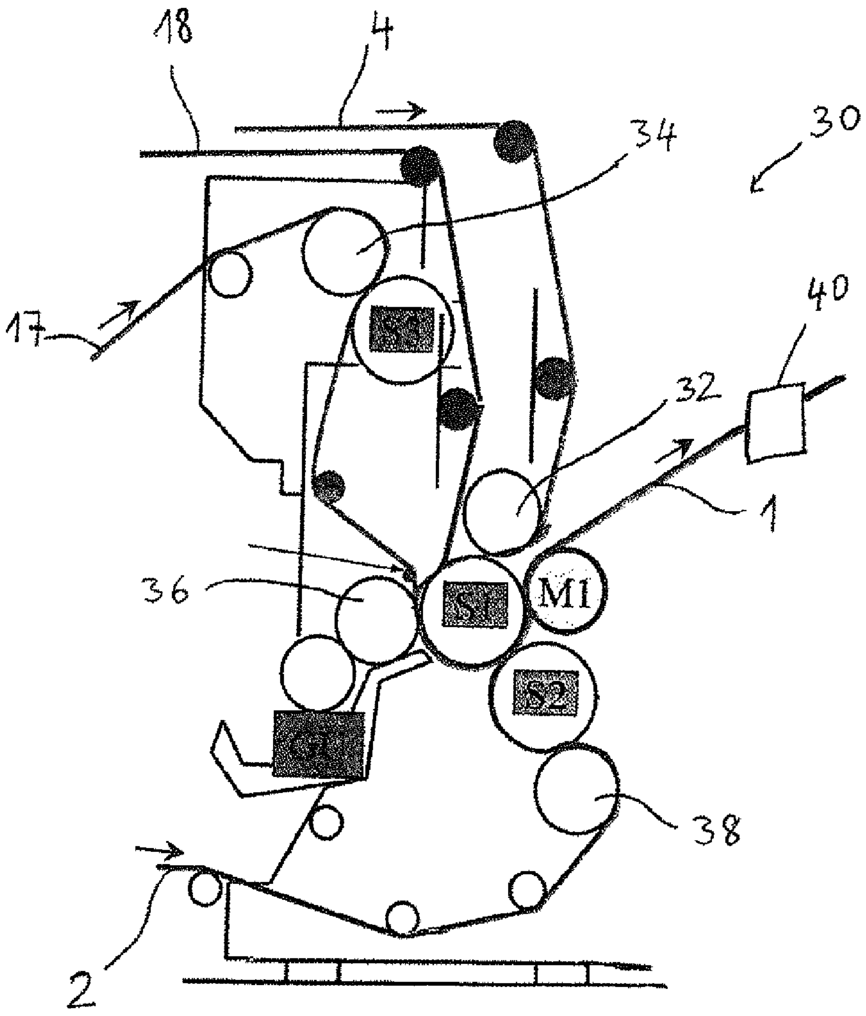
FIG. 5 schematically shows a process for manufacturing a product according to FIG. 6.

The embodiment according to FIG. 4 is very similar to that according to FIG. 1. As will be appreciated, the position of the inner plies 17 and 18 between the top ply and the bottom ply is reversed to that according to FIG. 1. The corresponding device 30 according to figure distinguishes over that according to FIG. 3 in that the position where the un-embossed middle ply 18 is directed toward the embossing roll S1 is different to that according to FIG. 3. In the device 30 according to FIG. 5, the un-embossed middle ply 18 is directed towards the embossing roll S1 downstream of the nip between the embossing roll S1 and the counter roll 32 in which the top ply 4 is embossed, but upstream before the micro-embossed middle ply 17 is joined. The application of glue at the glue application device 36 is towards the embossed middle ply 17. As in the preceding examples of FIGS. 3 and 5, the bottom ply 2 joins the other plies downstream of the glue application device 36 and runs through the nip between the embossing roll 52 and the counter roll 39, and the gap between the embossing roll S1 and the embossing roll S2. The ply bonding of all plies is carried out like in the devices as discussed above in the nip between the embossing roll S1 and the driven marrying roll M1.

Figure 6:
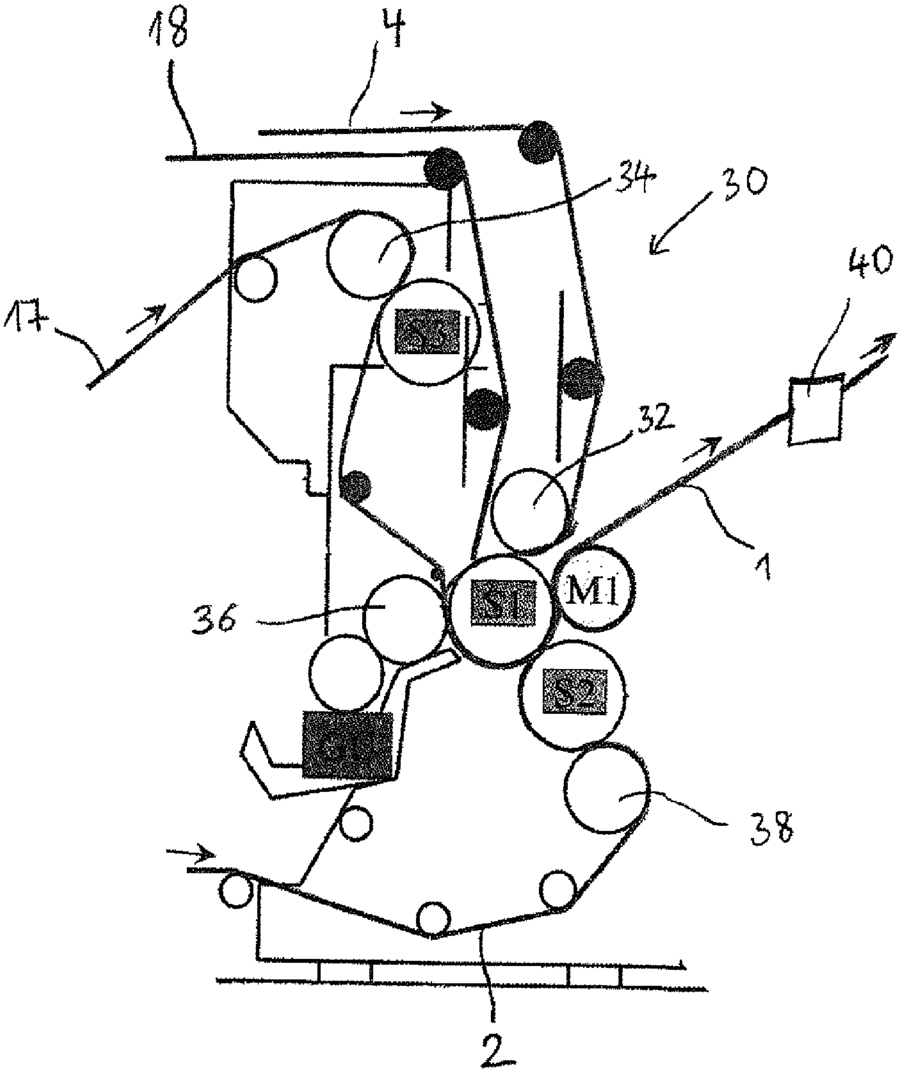
FIG. 6 schematically shows a process for manufacturing a further alternative product.

A further possible process is shown with reference to the device 30 according to FIG. 6. In the device 30 according to FIG. 6, the embossed middle ply 17 consists of two layers which are embossed together in the nip between the embossing roll S3 and the counter roll 34. Between the embossed middle plies 17 and the top ply 4, the un-embossed middle ply 18 is provided. Accordingly, like in the embodiment of FIG. 5, the un-embossed middle ply 18 is directed toward the embossing roll S1 downstream of the nip between the embossing roll S1 and the counter roll 32 in which the top ply 4 is embossed, but upstream of the position at which the micro-embossed middle plies 17 are joined. The application of glue at the glue application device 36 is towards the embossed middle plies 17. As in the preceding examples of FIGS. 3 and 5, the bottom ply 2 joins the other plies downstream of the glue application device 36 and runs through the gap between the embossing roll S1 and the embossing roll S2. The ply bonding is carried out like in the devices as discussed above in the nip between the embossing roll S1 and the driven marrying roll M1.

All products according to the invention have in common that they have an improved caliper, strength and softness. The advantageous provision of a micro-embossed soft region on the top ply can further make the product both aesthetically pleasing and soft.

The invention claimed is:

1. A tissue product with at least four plies made of tissue paper base sheet or nonwoven, comprising:

a first outer ply and a second outer ply and at least two inner plies between the first outer ply and the second outer ply, wherein only one of the inner plies is un-embossed;

at least one of the outer plies comprises a décor embossing pattern;

at least two adjacent inner plies comprise the un-embossed inner ply and one micro-embossed inner ply; and the outer plies comprise a micro-embossing pattern, wherein either the density of the micro-embossed protrusions of the micro-embossed inner ply is different to the density of embossed protrusions of the micro-embossing pattern of the outer ply which is adjacent to the micro-embossed inner ply or the micro-embossed protrusions of the micro-embossed inner ply and the embossed protrusions of the adjacent outer ply are not in register with one another.

2. The tissue product according to claim 1, wherein at least one of the embossed plies comprises a double layer or plural layers.

3. The tissue product according to claim 1, wherein the density of the embossed protrusions of the micro-embossing pattern of the inner ply is different to the density of the protrusions of a second micro-embossing pattern of the second outer ply.

4. The tissue product according to claim 3, wherein a middle ply adjacent to first outer ply is provided with a décor embossing region with further embossed décor protrusions which are in register with the first embossed décor protrusions.

5. The tissue product according to claim 1, wherein the un-embossed inner ply is adjacent to the first outer ply or second outer ply.

6. The tissue product according to claim 1, wherein at least three inner plies are provided and a first inner ply not adjacent to the first outer ply or second outer ply is provided with a micro-embossing pattern; and a second inner ply between the first inner ply and either the first outer ply or second outer ply is un-embossed.

7. The tissue product according to claim 6, wherein the micro-embossing pattern of the first inner ply extends essentially all over the surface of the first inner ply.

8. The tissue product according to claim 1, the tissue product either comprising a stack of individual sheets or a roll with transversely extending weakening lines to subdivide the web into individual sheets.

9. The tissue product according to claim 8, wherein the embossing is in register with the dimensions of the individual sheets of the tissue product.

10. The tissue product according to claim 1, wherein the application of glue is restricted to an overall surface fraction of less than 12% of the tissue product.

11. The tissue product according to claim 1, wherein the décor embossing region of the first outer ply further comprises second embossed décor protrusions with a smaller height than the height of the first embossed décor protrusions.

12. A tissue product with at least four plies made of tissue paper base sheet or nonwoven, comprising:

a first outer ply and a second outer ply and at least two inner plies between the first outer ply and the second outer ply, wherein only one of the inner plies is un-embossed;

at least one of the outer plies comprises a décor embossing pattern;

at least two adjacent inner plies comprise the un-embossed inner ply and one micro-embossed inner ply;

the outer plies comprise a micro-embossing pattern, wherein either the density of the micro-embossed protrusions of the micro-embossed inner ply is different to the density of embossed protrusions of the micro-embossing pattern of the outer ply which is adjacent to the micro-embossed inner ply or the micro-embossed protrusions of the micro-embossed inner ply and the embossed protrusions of the adjacent outer ply are not in register with one another;

a portion of the outwardly facing main surface of the first outer ply is provided with a soft region surrounded by a décor embossing region;

the soft region is provided with first micro-embossed protrusions;

the décor embossing region comprises first embossed décor protrusions; and the first micro-embossed protrusions are essentially not adhesively bonded to an inner ply adjacent to the first outer ply.

13. The tissue product according to claim 12, wherein the first micro-embossed protrusions of the first outer ply and/or the embossed protrusions of the micro-embossing pattern of the micro-embossed inner ply and/or the protrusions of a second micro-embossing pattern of the second outer ply are arranged in a density from 30 to 200 dots/$cm^2$.

14. The tissue product according to claim 12, wherein less than 0.5% of the first micro-embossed protrusions are adhesively bonded to an inner ply adjacent to the first outer ply.

15. The tissue product according to claim 12, wherein the soft region surrounded by the décor embossing region covers between 25% and 90% of the outwardly facing main surface of the first outer ply.

16. The tissue product according to claim 12, wherein the soft region has an overall oval shape.

* * * * *